US011817640B2

(12) United States Patent
Kim et al.

(10) Patent No.: US 11,817,640 B2
(45) Date of Patent: Nov. 14, 2023

(54) ELECTRICAL CABLE DEVICE WITH TELESCOPING SHIELDING FEATURES

(71) Applicant: SAMSUNG ELECTRONICS CO., LTD., Suwon-si (KR)

(72) Inventors: Jinsub Kim, Suwon-si (KR); Yongjune Park, Suwon-si (KR); Sungook Ok, Suwon-si (KR); Sangwon Ha, Suwon-si (KR); Dongjin Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 108 days.

(21) Appl. No.: 17/008,052

(22) Filed: Aug. 31, 2020

(65) Prior Publication Data

US 2021/0111520 A1  Apr. 15, 2021

(30) Foreign Application Priority Data

Oct. 11, 2019  (KR) .................... 10-2019-0125924

(51) Int. Cl.
*H01R 13/6581*  (2011.01)
*G02B 6/42*  (2006.01)
(Continued)

(52) U.S. Cl.
CPC ....... *H01R 13/6581* (2013.01); *G02B 6/3817* (2013.01); *G02B 6/428* (2013.01);
(Continued)

(58) Field of Classification Search
CPC .............. H01R 13/6581; H01R 13/652; H01R 13/6594; H01R 12/722; H01R 31/065; G02B 6/3817; G02B 6/4277; G02B 6/428; G02B 6/4283; G02B 6/4278; G02B 6/4293; H01B 9/005; H01B 9/02
See application file for complete search history.

(56) References Cited

U.S. PATENT DOCUMENTS 4,741,702 A    5/1988 Yasumoto
10,734,768 B2  8/2020 Lei et al.
(Continued)

FOREIGN PATENT DOCUMENTS

KR  1020200043228 A  4/2020
WO  2019/221846 A1  11/2019

OTHER PUBLICATIONS

Communication dated Nov. 26, 2020, issued by the European Patent Office in European Application No. 20195334.6.
(Continued)

*Primary Examiner* — Hae Moon Hyeon
*Assistant Examiner* — Justin M Kratt
(74) *Attorney, Agent, or Firm* — Sughrue Mion, PLLC (57) ABSTRACT

Provided is a cable device having an improved electromagnetic interference (EMI) shielding performance. The cable device includes: a cable including an optical fiber; a connector including a printed circuit board connected to the
(Continued)

cable and including a ground electrode, and a conductive case; a connecting member provided around a connection between the cable and the connector; and a metal shell surrounding the cable inside of the connecting member, the metal shell being configured to shield electromagnetic interference of the cable and the connector.

18 Claims, 12 Drawing Sheets

(51) Int. Cl.
    *H01B 9/00*         (2006.01)
    *H01R 13/6594*   (2011.01)
    *G02B 6/38*         (2006.01)
    *H01R 13/652*    (2006.01)
    *H01R 12/72*     (2011.01)
    *H01R 31/06*     (2006.01)
    *H01B 9/02*         (2006.01)

(52) U.S. Cl.
    CPC ......... *G02B 6/4277* (2013.01); *G02B 6/4283* (2013.01); *H01B 9/005* (2013.01); *H01R 13/652* (2013.01); *H01R 13/6594* (2013.01); *G02B 6/4278* (2013.01); *G02B 6/4293* (2013.01); *H01B 9/02* (2013.01); *H01R 12/722* (2013.01); *H01R 31/065* (2013.01)

(56) References Cited

U.S. PATENT DOCUMENTS

| | | | |
|---|---|---|---|
| 2004/0147166 A1 | 7/2004 | Lai | |
| 2005/0277335 A1 | 12/2005 | Gordon et al. | |
| 2013/0175080 A1 | 7/2013 | Colahan | |
| 2014/0112628 A1* | 4/2014 | Keenum | G02B 6/428 |
| | | | 29/829 |
| 2015/0331210 A1* | 11/2015 | Lee | G02B 6/4246 |
| | | | 385/89 |
| 2019/0356090 A1* | 11/2019 | Lei | H01R 31/065 |
| 2021/0167723 A1* | 6/2021 | Yoscovich | H02S 50/00 |

OTHER PUBLICATIONS

Communication dated Mar. 1, 2021, issued by the European Patent Office in European Application No. 20195334.6.
Communication dated Jun. 23, 2023, issued by European Patent Office in European Patent Application No. 20195334.6.

* cited by examiner

ELECTRICAL CABLE DEVICE WITH TELESCOPING SHIELDING FEATURES

CROSS-REFERENCE TO RELATED APPLICATION(S)

This application is based on and claims priority under 35 U.S.C. § 119 to Korean Patent Application No. 10-2019-0125924, filed on Oct. 11, 2019, in the Korean Intellectual Property Office, the disclosure of which is incorporated by reference herein in its entirety

BACKGROUND

1. Field

The disclosure relates to a cable device, and more particularly, to a cable device having an improved electromagnetic interference (EMI) shielding performance.

2. Description of Related Art

Electromagnetic interference (EMI) is caused by electromagnetic disturbances interacting with electromagnetic signals. Difficulties caused by the EMI have increased due to the increase in the use of the electromagnetic wave technology.

Accordingly, electronic products have been required to have an electromagnetic shielding structure.

A cable may include a conductor, such as a copper wire, for high voltage power transmission. The cable may have an electromagnetic shielding structure surrounding the conductor to shield electromagnetic waves generated from the conductor.

A cable including the electromagnetic shielding structure may have a black color or a prominent primary color. When the cable having the black color or the primary color is connected to an electronic device, the cable may be exposed to the outside of the electronic device and may impair the appearance because the cable is easily identified with the naked eye.

In addition, a cable without an electromagnetic shielding structure is called an invisible cable because it is difficult to be identified with the naked eye. Recently, invisible cables have become popular to prevent the design degradation of the electronic device caused by the colored cable.

However, such an invisible cable has difficulty shielding electromagnetic radiation emitted from a connector connected to the invisible cable.

SUMMARY

Provided is a cable device having improved electromagnetic interference (EMI) shielding performance.

Also provided is a cable device capable of reducing electromagnetic compatibility (EMC) noise without including a separate shielding structure.

Also provided is a cable device capable of improving EMI/electrostatic discharge (ESD) shielding performance in an optical cable including a conductive wire.

Additional aspects will be set forth in part in the description which follows and, in part, will be obvious from the description, or may be learned by practice of the presented embodiments.

In accordance with an aspect of the disclosure, a cable device may include: a cable including an optical fiber; a connector including a printed circuit board connected to the cable and including a ground electrode, and a conductive case; a connecting member provided around a connection between the cable and the connector; and a metal shell surrounding the cable inside of the connecting member, the metal shell being configured to shield electromagnetic interference of the cable and the connector.

The metal shell may include a metal body having a cylindrical shape; and a contact portion configured to connect the metal body to the conductive case.

The connecting member may be formed of an insulating material.

The conductive case may be connected to the ground electrode.

The contact portion may be formed of a metallic material.

The connecting member may include at least one cutout portion, and the contact portion may not overlap the at least one cutout portion.

The contact portion may include at least one of a metal wire, a metal plate, a metal bar, and a braided wire.

The metal shell may include a plurality of cylindrical bodies coupled to each other and having different diameters.

The metal shell further may include an adjustment device configured to telescopically adjust the plurality of cylindrical bodies.

The adjustment device may include a handle configured to move the plurality of cylindrical bodies in a sliding manner to increase or decrease an overlap of the plurality of cylindrical bodies.

The adjustment device further may include a guide portion having a plurality of grooves configured to lock the handle at different positions.

The metal shell may include a metal band configured to wind around an outside of the cable when rotated.

A length of the metal band may be variable according to a number of rotations in which the metal band is wound around the cable.

The cable device may further include a rotating bar configured to vary the number of rotations in which the metal band is wound around the cable.

In accordance with an aspect of the disclosure, a cable device includes: a cable including an optical fiber; a connector including a printed circuit board including a ground electrode connected to the cable, and a conductive case; a connecting member formed of an insulating material, the connecting member being configured to connect the cable to the connector; and a metal shell surrounding the cable inside of the connecting member and including a contact portion connecting the metal shell and the conductive case, the metal shell being configured to shield electromagnetic interference of the cable and the connector.

The metal shell may include a cylindrical body formed of a metallic material; and an adjustment device configured to vary a length of the metal shell.

The conductive case may be connected to the ground electrode.

The connecting member may include at least one cutout portion, the at least one cutout portion may include at least one slit, and the contact portion may be separated from the at least one slit.

The metal shell may include a plurality of cylindrical bodies coupled to each other and having different diameters.

The adjustment device may include a handle configured to telescopically adjust the plurality of cylindrical bodies to increase or decrease an overlap of the plurality of cylindrical bodies.

In accordance with an aspect of the disclosure, a cable device includes: a cable including an optical fiber; a connector attached to an end of the cable, the connector including a plug configured to transmit data received from the optical fiber; a metal shell surrounding the end of the cable; and a connecting member attached to the connector and surrounding the metal shell, wherein a length of the metal shell is adjustable for shielding different frequencies of electromagnetic radiation.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2 is a perspective view illustrating the cable device according to an embodiment;

DETAILED DESCRIPTION

Embodiments described in the disclosure and configurations illustrated in the drawings are merely examples of the embodiments of the disclosure, and may be modified in various different ways at the time of filing of the present application to replace the embodiments and drawings of the disclosure.

In addition, the same reference numerals or signs illustrated in the drawings of the disclosure indicate elements or components performing substantially the same function. The relative size and depiction of these elements are not necessarily to scale and may be exaggerated for clarity, illustration, and convenience.

Also, the terms used herein are used to describe the example embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

The disclosure will be described more fully hereinafter with reference to the accompanying drawings.

In general, a data receiver may be configured to receive data from a data transmitter through a data delivery device and display or reproduce the received data. Examples of data receivers may include multimedia playback devices such as a television or audio equipment.

A data transmitter may be configured to transmit data to a data receiver though a data delivery device in response to a request from the data receiver or a determination of the data transmitter. The data transmitter may include a connecting portion connectable to the data delivery device. Examples of data transmitters may include multi-media supply devices such as a set top box or a data box.

A data delivery device may deliver data, which is received from a data transmitter, to a data receiver. The data delivery device may include a connecting portion for connection with the data transmitter and a connecting portion for connection with the data receiver. An example of the data delivery device may include an optical cable.

The data delivery device may include at least one signal line for data signal delivery and one or more power lines for power transmission. The one or more signal lines may include optical fibers and the one or more power lines may include copper wire.

The at least one power line may include one or more standby power lines configured to transmit standby power to maintain a standby mode when the data transmitter and the data receiver are in the standby mode, and one or more main power line configured to transmit main power to maintain an operation mode when the data transmitter and the data receiver are in the operation mode.

In the following description, a display apparatus will be described as an example of a data receiver and a source device will be described as an example of a data transmitter.

Figure 1:
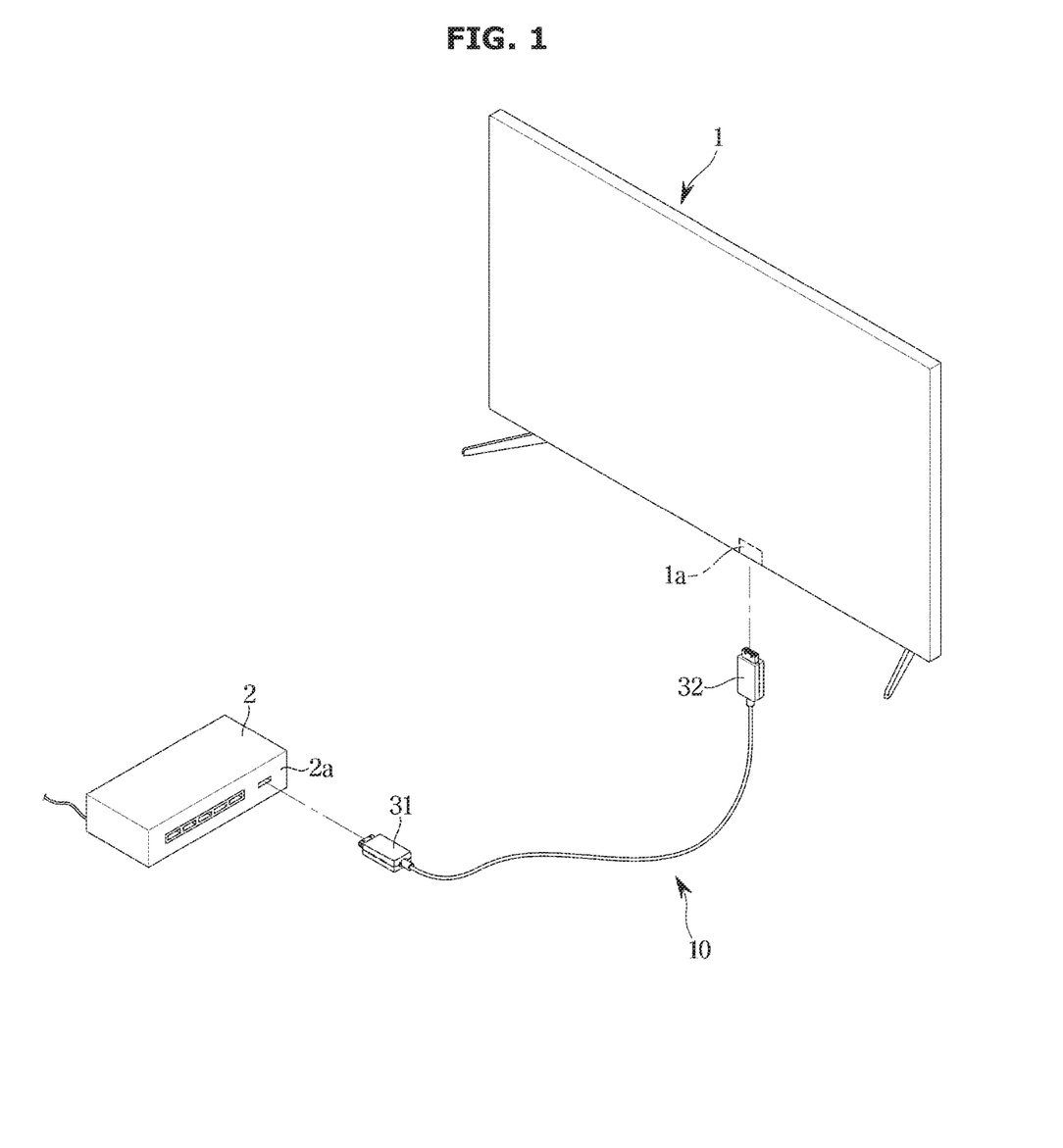
FIG. 1 is a perspective view illustrating a cable device provided in a display apparatus according to an embodiment.
Figure 3:
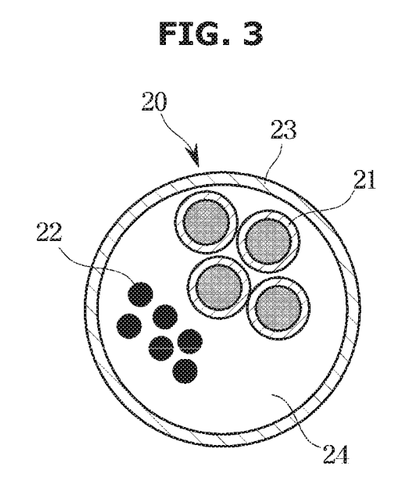
FIG. 3 is a cross-sectional view illustrating a cable of the cable device according to an embodiment.

FIG. 1 is a perspective view illustrating a cable device provided in a display apparatus according to an embodiment, FIG. 2 is a perspective view illustrating the cable device according to an embodiment, and FIG. 3 is a cross-sectional view illustrating a cable of the cable device according to an embodiment.

As illustrated in FIGS. 1, 2, and 3, a display apparatus 1 may be connected to a source device 2 through a cable device 10.

The display apparatus 1 is configured to display an image based on data received from the cable device 10. The display apparatus 1 may include a port 1a for physical/electrical connection of the cable device 10.

The source device 2 is configured to transmit data from various sources to the display apparatus 1. The source device 2 may include a port 2a for physical/electrical connection of the cable device 10.

The cable device 10 may include a cable 20 and a connector 30 connected to respective ends of the cable 20. The connector 30 may include a first connector 31 at one end of the cable 20, and a second connector 32 at the opposing end of the cable 20.

The cable device 10 is configured to physically/electrically connect the display apparatus 1 to the source device 2. The cable device 10 may include the first and second connectors 31 and 32 for providing the electrical connection between the display apparatus 1 and the cable device 10, and the source device 2 and the cable device 10. The cable device 10 may receive data from the source device 2 through the first connector 31 and transmit the received data to the display apparatus 1 through the second connector 32. The first connector 31 and the second connector 32 may be provided with the same configuration or with different configurations.

A plug 31*a* may be provided in the first connector 31 for coupling the first connector 31 to the port 1*a* of the display apparatus 1. A plug 32*a* may be provided in the second connector 32 for coupling the second connector 32 to the port 2*a* of the source device 2.

The cable device 10 may include the cable 20 for connecting the first connector 31 to the second connector 32. The cable 20 may interconnect the first connector 31 and the second connector 32.

The cable 20 may allow light to be transmitted therethrough, and thus it may be difficult for a user to identify the cable 20 with the naked eye. The cable 20 may include a conductor 21, a plurality of optical fibers 22, a sheath 23 in which the conductor 21 and the plurality of optical fibers 22 are accommodated, and a filler 24 filling a space between the conductor 21 and the plurality of optical fibers 22. The filler 24 may be a transparent material.

The sheath 23 and the filler 24 through which light is transmitted may be transparent. The sheath 23 and filler 24 may be formed of a transparent material(s) that transmit some light waves or light waves having a specific wavelength.

The conductor 21 may transmit power from the source device 2 to the display apparatus 1. The conductor 21 may include a copper wire.

The plurality of optical fibers 22 may transmit an optical signal from the source device 2 to the display apparatus 1.

The plurality of optical fibers 22 may provide a transmission medium for optical signals, and may be composed of a transparent core and a transparent cladding.

The core for transmission of an optical signal may be located at a center of the optical fibers 22 and may have a relatively high refractive index. An optical signal may be totally reflected along a longitudinal direction in the core. The cladding, for confining the optical signal in the core, is disposed on an outside of the core and has a relatively low refractive index.

The sheath 23 is located on the outermost side of the cable 20, and may be configured to protect the conductor 21 and the plurality of optical fibers 22 from the external environment. The sheath 23 may be formed of an insulating material. The sheath 23 may be formed of a single material such as a single piece manufactured through an extrusion process. The sheath 23 may have a high tensile strength and high hardness.

The sheath 23 may be formed of a material through which light is transmitted. For example, the sheath 23 may include polyvinyl chloride (PVC).

The sheath 23 may be formed in a tube shape, and may surround the plurality of optical fibers 22 to form a protective layer.

The sheath 23 may transmit light to be less visible to the naked eye. For example, the sheath 23 may be transparent to transmit light. The sheath 23 may allow light, which is incident to the sheath 23, to pass therethrough. Further, the plurality of optical fibers 22, the filler 24, and the conductor 21 disposed in the inside of the sheath 23 may also transmit light.

Accordingly, a user may recognize the light passing through the sheath 23 according to a viewing angle, and thus the user may perceive the cable 20 as a floor or the periphery in which the cable 20 is placed. Therefore, it may be difficult for a user to recognize the cable 20 with the naked eye.

According to an embodiment, the cable 20 may not include the filler 24 arranged in the inside of the sheath 23 for filling a space around the conductor 21 and the plurality of optical fibers 22.

In some embodiments, the filler 24 may be configured to prevent the cable 20 from bending over a predetermined angle so as to prevent the plurality of optical fibers 22 from being severed due to bending. That is, the filler 24 may be provided to reinforce the optical fiber having a relatively low bending strength. According to an embodiment, the cable 20 may include the conductor 21 in the inside of the sheath 23, and the conductor 21 may have a relatively high bending strength. The bending strength of the cable 20 may be increased due to the conductor 21 disposed in the inside of the sheath 23. Accordingly, even when an additional filler is not provided in the inside of the sheath 23, it is possible to prevent the optical fiber 22 from being severed, through bending of the cable 20, by increasing the bending strength of the cable 20.

According to an embodiment, the cable 20 of the cable device 10 may not include an electromagnetic interference (EMI) shielding structure.

The cable 20 may include the conductor 21 in the inside of the sheath 23. In some embodiments, the cable including the conductor 21 may include the EMI shielding structure for shielding electromagnetic waves that are delivered from the external device to the outside of the cable through the conductor. For example, the EMI shielding structure may include aluminum foil and/or braid wire provided to surround the conductor. However, the cable including the EMI shielding structure has a color prominent to the user, such as black. Accordingly, the cable that is visible to the user may degrade the appearance of the electronic device. In order to improve the aesthetics of an electronic device without degrading the appearance of the electronic device, the cable 10 may not include the EMI shielding structure. However, when the cable does not include the EMI shielding structure, it is difficult to shield EMI in the connector connected to the cable and thus a method for shielding the EMI may be required. According an embodiment, for the cable device 10 that does not include an EMI shielding structure and includes the cable 20 capable of transmitting power, it is possible to improve the EMI shielding performance in the first and second connectors 31 and 32 connected to the cable 20.

Figure 4:
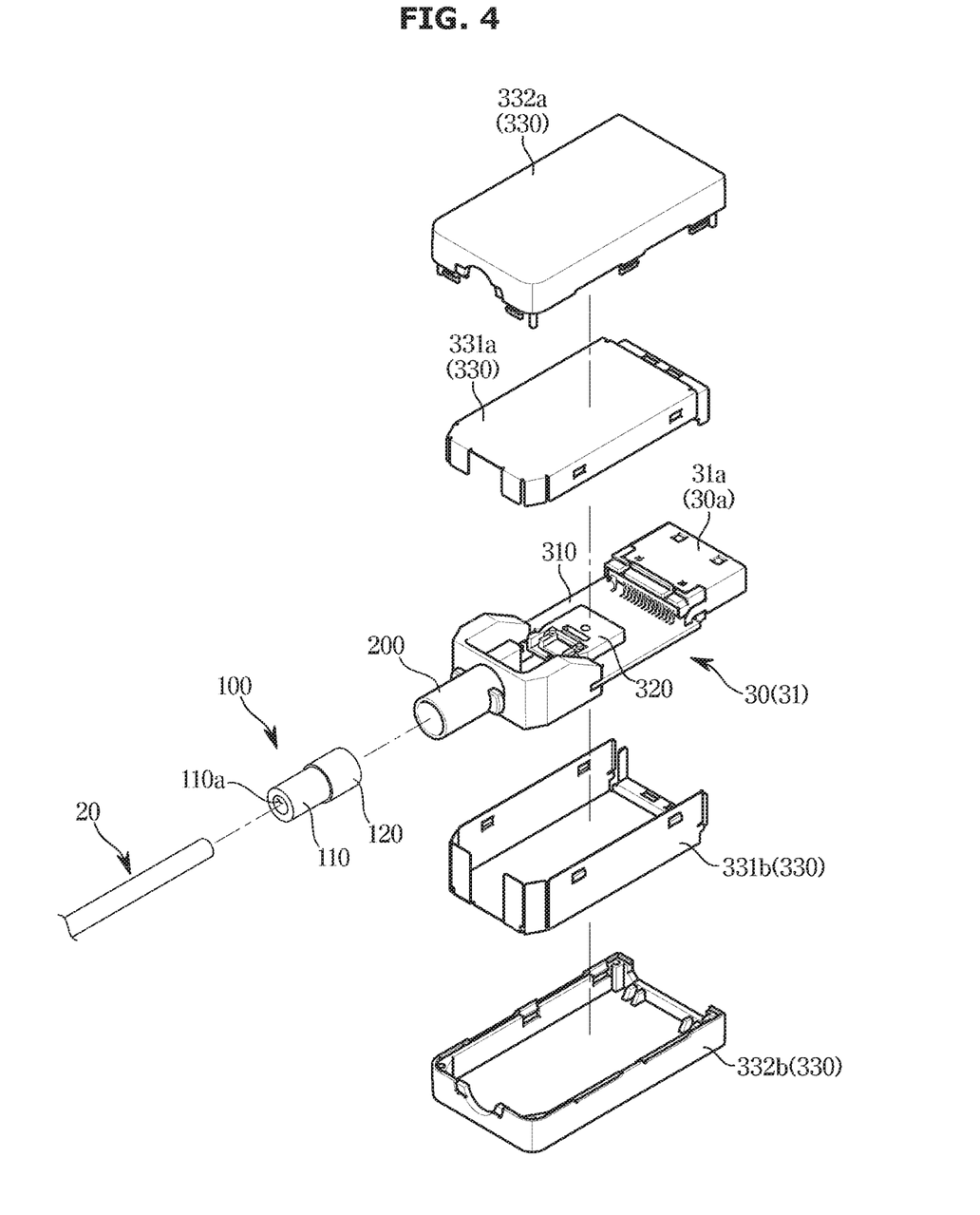
FIG. 4 is an exploded perspective view illustrating the cable device according to an embodiment.
Figure 5:
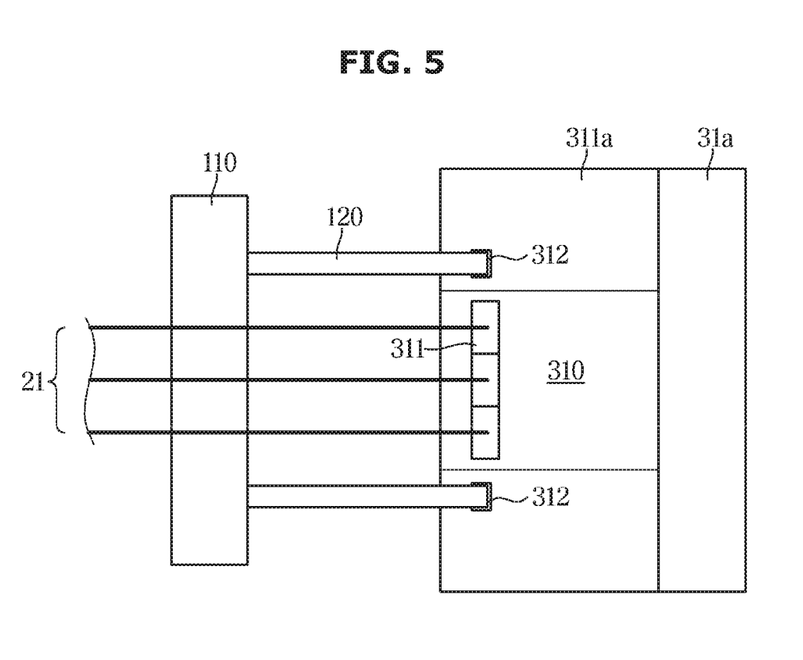
FIG. 5 is a schematic view illustrating a printed circuit board connected to the cable device according to an embodiment.

FIG. 4 is an exploded perspective view illustrating the cable device according to an embodiment, and FIG. 5 is a schematic view illustrating a printed circuit board connected to the cable device according to an embodiment.

As illustrated in FIGS. 4 and 5, the cable device 10 may include a metal shell 100 arranged between the cable 20 and the connector 30, which may be the first connector 31 and/or the second connector 32.

A connecting member 200 may be provided between the cable 20 and the connector 30. The connecting member 200 may be formed of an insulating material. For example, the connecting member 200 may be formed of a rubber or a plastic material. The connecting member 200 may connect the cable 20 and the connector 30. The connecting member 200 may be configured to move the cable 20 connected to the connector 30 to a certain degree. The connecting member 200 may surround a connecting portion between the cable 20 and the connector 30. The connecting member 200 may allow the cable 20 to be flexibly moved. The connecting member 200 may be formed of a flexible material including PVC, PC, and plastic.

The metal shell 100 may be provided in the inside of the connecting member 200. The metal shell 100 may be formed in a tube shape. The metal shell 100 may be formed of a metallic material. The metal shell 100 may be provided between an outside of the cable 20 and an inside of the connecting member 200. The metal shell 100 may include a hollow portion 110a extending therethrough. The metal shell 100 may include a cylindrical metal body (tube) 110 defining the hollow portion 110a. The metal shell 100 may be configured to shield EMI between the cable 20 and the connector 30. The metal shell 100 may include the metal body 110 and a contact portion 120 extending from the metal body 110. The contact portion 120 may extend from one side of the metal body 110.

The metal shell 100 may be connected to the connector 30 through the contact portion 120. The contact portion 120 may be formed of a metallic material. The contact portion 120 may physically/electrically connect the metal body 110 to the connector 30. The contact portion 120 may be provided in the inside of the connecting member 200. The contact portion 120 may connect the metal body 110 to the connector 30 in the inside of the connecting member 200. In an example embodiment of the disclosure, the contact portion 120 may be formed separately from the metal body 110 and then connected. In another example embodiment, the contact portion may be integrally formed with the metal body and then assembled.

The metal shell 100 may allow the ground (GND) potential to flow by inducing high-frequency components or high-pressure surge noise to the metal. In addition, the metal shell 100 increases the impedance characteristic of the cable 20 so as to prevent high-frequency components or high-pressure surge noise from flowing therethrough.

The metal body 110 of the metal shell 100 may be disposed at a specific position of the cable 20 so as to be adjusted according to the characteristics of the system or required reduction of a frequency band.

The connector 30 may include a printed circuit board 310 connected to the cable 20 and provided with a ground electrode 311, and a conductive case 330 accommodating the printed circuit board 310.

The connector 30 may include the printed circuit board 310, a plug 30a coupled to the printed circuit board 310 for connecting an external device to the connector 30, and the case 330 in which the printed circuit board 310 is accommodated.

The printed circuit board 310 may include a lens unit 320 configured to deliver an optical signal from the plurality of optical fibers 22 to the printed circuit board 310. An optical element and a driving integrated circuit (IC) configured to control the optical element may be provided in the lens unit 320. The optical element may include a vertical cavity surface emitting laser (VCSEL) chip and a photodiode (PD) chip.

The case 330 may cover a front surface of the printed circuit board 310. The case 330 may accommodate the printed circuit board 310 therein.

The case 330 may include first cases 331a and 331b that accommodate the printed circuit board 310 therein and second cases 332a and 332b provided on the outside of the first cases 331a and 331b and formed of an insulating material. Each case 330 may be provided in a pair of upper and lower portions configured to be coupled to each other.

The first cases 331a and 331b may be formed of a material having high conductivity such as a metallic material.

The second cases 332a and 332b may be in contact with the first cases 331a and 331b. The second cases 332a and 332b may include an insulating material.

The second cases 332a and 332b may cover an outer side of the first cases 331a and 331b, and thus even when the current flows through the first cases 331a and 331b, the current may not flow to the second cases 332a and 332b. Therefore, even when a user holds the second cases 332a and 332b, electric shock caused by the current delivered to the connector 30 through the cable 20 may not occur.

The printed circuit board 310 provided in the case 330 may include a plurality of electrodes 311 respectively connected to the conductors 21 of the cable 20. One or more of electrodes 311 may be power source electrodes. The conductor 21 may be configured to transmit power. The conductor 21 may deliver power to the printed circuit board 310 through the power source electrodes 311.

The lens unit 320 may be a plurality of lens units connecting the plurality of optical fibers 22 of the cable 20 to the printed circuit board 310 and may be provided on the printed circuit board 310. The plurality of lens units 320 may include a plurality of jumpers and a plurality of lenses. The plurality of jumpers may be connected to the plurality of optical fibers 22 and serve to connect the optical fiber 22 to the printed circuit board 310. The plurality of lens units 320 may be provided with jumpers and lenses respectively corresponding to the plurality of optical fibers 22, and may deliver an optical signal from the printed circuit board 310 to the cable 20.

The contact portion 120 of the metal shell 100 may be connected to the first cases 331a and 331b. One end of the contact portion 120 of the metal shell 100 may be connected to the metal body 110 and the other end of the contact portion 120 may be connected to the first cases 331a and 331b of the connector 30. The contact portion 120 may be electrically/physically connected to the first cases 331a and 331b. The contact portion 120 may be connected to at least one side of the first cases 331a and 331b. The contact portion 120 may be connected to the printed circuit board 310 through the first cases 331a and 331b. The contact portion 120 may include at least one of a metal tube, a thin metal wire, a metal plate, a metal bar, and a braided wire. The contact portion 120 may be fixed to the metal body 110 and the connector 30 using at least one of brazing 312, soldering, and conductive taping. The contact portion 120 may be fixed to the first cases 331a and 331b of the connector 30 using at least one of brazing 312, soldering, and conductive taping.

A case 300, in which the contact portion 120 of the metal shell 100 is a metal bar connecting the metal body 110 to the first cases 331a and 331b, has been described as an example embodiment. According to another example embodiment, the contact portion 120 may include at least one of a metal ring, tube or line, and may include various structures configured to physically/electrically connect the metal body 110 to the connector 30.

In addition, the contact portion 120 may be adjusted to the required frequency band by adjusting the number of the metal bodies 110 or the size and shape of the metal body 110 such as a thickness or length.

Figure 6:
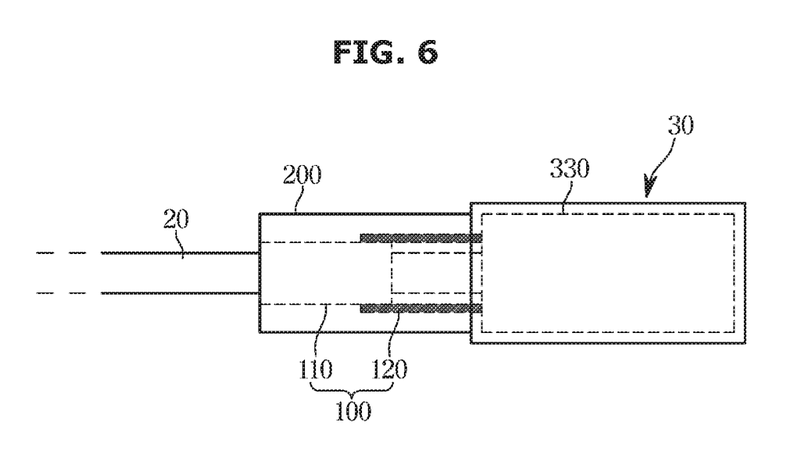
FIG. 6 is a schematic view illustrating a metal shell of the cable device according to an embodiment.
Figure 7:
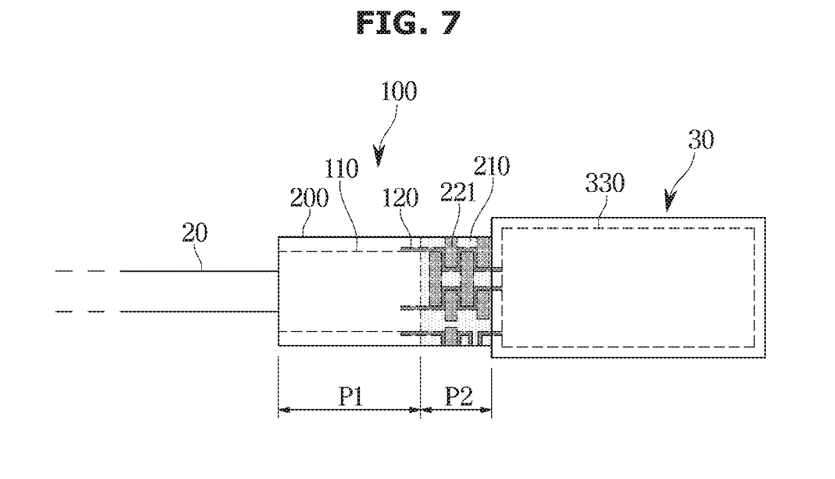
FIG. 7 is a schematic view illustrating a contact portion and the metal shell according to an embodiment.

FIG. 6 is a schematic view illustrating a metal shell of the cable device according to an embodiment, and FIG. 7 is a schematic view illustrating a contact portion and the metal shell according to an embodiment. For reference numerals not shown, refer to FIGS. 1 to 5.

As shown in FIGS. 6 and 7, the connecting member 200 of the cable device 10 may connect the cable 20 and the connector 30. The connecting member 200 is configured to allow the cable 20, which is connected to the connector 30, to be movable in a certain degree with respect to the connector 30. The connecting member 200 may surround the connection between the cable 20 and the connector 30. A cutout portion 210 may be formed of an insulating material. The connecting member 200 may include rubber or a plastic material. The connecting member 200 may be arranged between the cable 20 and the printed circuit board 310 and may allow the cable 20 therein to be flexed or bent. The connecting member 200 may include at least one cutout portion 210. The cutout portion 210 of the connecting member 200 may allow the portion of the cable 20 within the connecting member to be flexed or bent. The cutout portion 210 may extend in a circumferential direction around the connecting member. The cutout portion 210 may include a slit or a hole extending in the circumferential direction of the connecting member 200. The connecting member may include a plurality of cutout portions 210 spaced apart from each other.

The connecting member 200 may include a first region P1 in which the metal body 110 is arranged, and a second region P2 on at least one side of the first region P1 and in which the contact portion 120 is arranged.

The cutout portion 210 may be formed in the second region P2 of the connecting member 200. The cutout portion 210 may include at least one slit 221. A plurality of slits 221 may be spaced apart from each other. The plurality of slits 221 may be arranged at positions not overlapping each other.

The contact portion 120 of the metal shell 100 may be arranged so as not to overlap the cutout portion 210 in the second region P2 of the connecting member 200. The contact portion 120 may include at least one of a metal wire, a thin metal, a metal plate, a metal bar, and a braided wire. The contact portion 120 may be disposed at a position not overlapping the cutout portion 210 of the connecting member 200 and thus the contact portion 120 may not be exposed to the outside. Therefore, since the contact portion 120 of the metal shell 100 may be disposed to not overlap the cutout portion 210 of the connecting member 200, the EMI reduction performance may be maintained without damaging the appearance.

Figure 8:
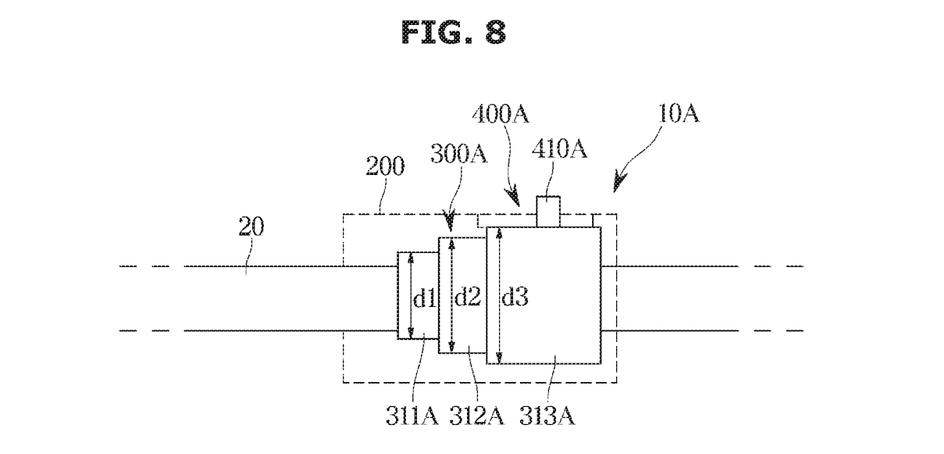
FIG. 8 is a schematic view illustrating a metal shell and an adjustment device according to another embodiment.
Figure 9:
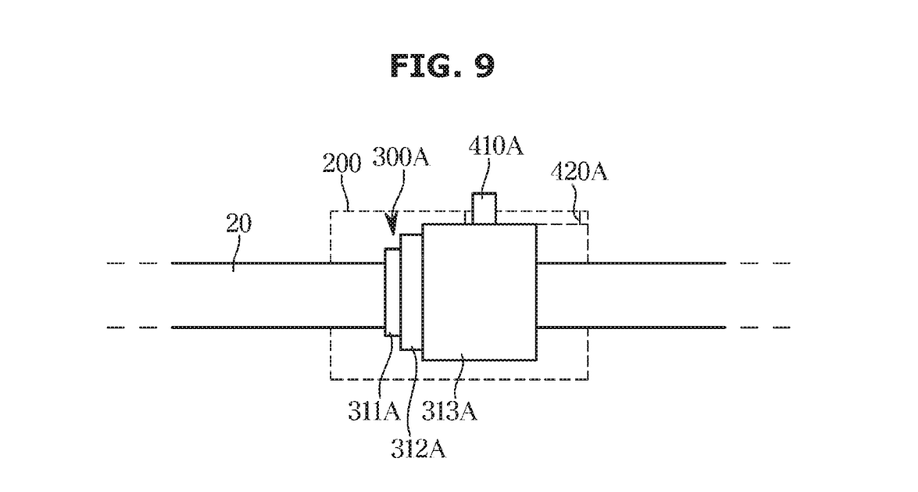
FIG. 9 is a schematic view illustrating the metal shell and the adjustment device according to another embodiment.
Figure 10:
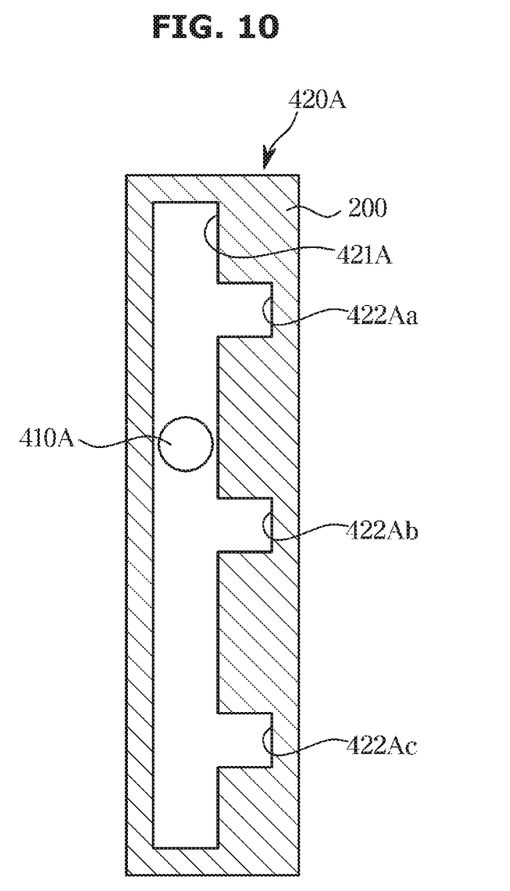
FIG. 10 is a schematic view illustrating the adjustment device according to another embodiment.

FIGS. 8 and 9 are schematic views illustrating a metal shell and an adjustment device according to another embodiment, and FIG. 10 is a schematic view showing the adjustment device according to another embodiment. For reference numerals not shown, refer to FIGS. 1 to 5.

As illustrated in FIGS. 8, 9, and 10, a metal shell 300A of a cable device 10A may further include an adjustment device 400A.

The metal shell 300A may be provided to have different diameters. For example, the metal shell 300A may include first, second, and third cylindrical bodies 311A, 312A, and 313A having different diameters. The metal shell 300A may include the adjustment device 400A configured to adjust a distance among the first, second, and third cylindrical bodies 311A, 312A, and 313A having different diameters. That is, an overlap between the first, second, and third cylindrical bodies 311A, 312A, and 313A may be adjusted to adjust the overall length of the metal shell 300A.

The first cylindrical body 311A may have a first diameter d1, the second cylindrical body 312A may have a second diameter d2, and the third cylindrical body 313A may have a third diameter d3.

The first diameter d1 may be less than the second diameter d2, and the second diameter d2 may be less than the third diameter d3. The second cylindrical body 312A may be provided at one end of the first cylindrical body 311A, and the third cylindrical body 313A may be provided at one end of the second cylindrical body 312A. The first cylindrical body 311A may be accommodated in the inside of the second cylindrical body 312A, and the second cylindrical body 312A may be accommodated in the inside of the third cylindrical body 313A to provide a telescopic relationship between the cylindrical bodies 311A, 312A, and 313A.

The adjustment device 400A may be provided in the third cylindrical body 313A to move the third cylindrical body 313A in a longitudinal direction of a cable 20 in a sliding manner. The adjustment device 400A may include a handle 410A protruding from at least a portion of an outer circumferential surface of the third cylindrical body 313A. The handle 410A may be integrally formed with the third cylindrical body 313A.

Since a user can relatively increase or reduce a distance among the first cylindrical body 311A, the second cylindrical body 312A, and the third cylindrical body 313A by moving the handle 410A of the adjustment device 400A, the user can adjust the cable device 10A to provide electromagnetic compatibility (EMC) noise reduction for different frequency characteristics.

The adjustment device 400A may further include a guide portion 420A surrounding the handle 410A. The guide portion 420A may be formed on at least a portion of the connecting member 200.

The guide portion 420A may include a guide 421A formed in the longitudinal direction on an outer circumferential surface of the connecting member 200, and a plurality of guide grooves 422Aa, 422Ab, and 422Ac extending from at least portion of the guide 421A. The plurality of guide grooves 422Aa, 422Ab, and 422Ac may include a first guide groove 422Aa formed to extend from one end of the guide 421A to one side of the circumferential direction, a second guide groove 422Ab spaced apart from the first guide groove 422Aa and formed to extend from a center of the guide 421A to one side of the circumferential direction, and a third guide groove 422Ac spaced apart from the second guide groove 422Ab and formed to extend from the other end of the guide 421A to one side of the circumferential direction.

The handle 410A of the adjustment device 400A may be fixed by at least one of the first guide groove 422Aa to the third guide groove 422Ac of the guide portion 420A. Through the adjustment device 400A, a size and length of the metal shell 300A may be adjusted according to the characteristics of the system or the required reduction of a frequency band.

Figure 11:
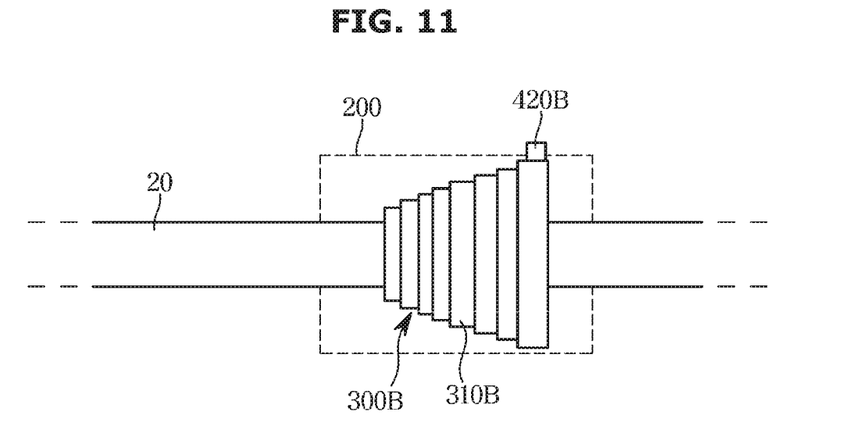
FIG. 11 is a schematic view illustrating a metal shell and an adjustment device according to still another embodiment.
Figure 12:
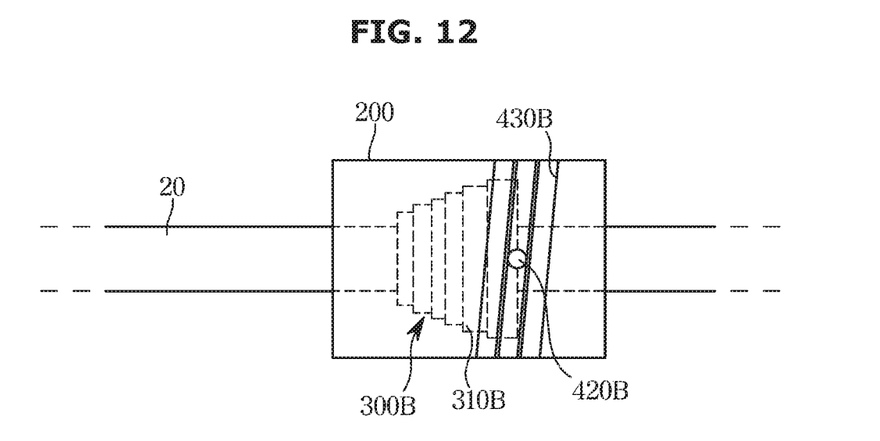
FIG. 12 is a schematic view illustrating the metal shell and the adjustment device according to still another embodiment.

FIGS. 11 and 12 are schematic views illustrating a metal shell and an adjustment device according to still another embodiment. For reference numerals not shown, refer to FIGS. 1 to 5.

As illustrated in FIGS. 11 and 12, a metal shell 300B of a cable device may include a metal band 310B formed of a metallic material.

The metal band 310b may be a plate-shaped band formed by elongating a metallic material. The metal band 310B may be arranged between an outer side of the cable 20 and an inner side of a connecting member 200. The metal band 310B may be arranged in such a way that one end thereof is fixed to at least one of the cable 20 or the connecting member 200. A length of the metal band 310B may be variable according to the number of rotations in which the metal band 310B winds around the cable 20. A rotating bar 420B may be provided at the other end of the metal band 310B. The rotating bar 420B may be configured to vary the number of rotations in which the metal band 310B winds around the cable 10. A guide 430B for guiding rotation of the rotating bar 420B may be formed on the connecting member 200.

A user can adjust the length of the metal shell 300B by rotating the rotating bar 420B along the guide 430B formed on an outer circumferential surface of the connecting member 200, and thus the user may adjust the metal shell 300B to have EMC noise reduction frequency characteristics.

As is apparent from the above description, it is possible to reduce EMC noise and to improve EMI/ESD shielding performance without including a separate shielding structure.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A cable device comprising:
   a cable comprising an optical fiber;
   a connector comprising:
     a printed circuit board connected to the cable and comprising a ground electrode; and
     a conductive case accommodating the printed circuit board;
   a connecting member provided outside of the connector and provided around a connection between the cable and the connector, wherein the connecting member is formed of an insulating material and is disposed between the conductive case and the cable; and
   a metal shell surrounding the cable inside of the connecting member, the metal shell being configured to shield electromagnetic interference (EMI) of the cable and the connector,
   wherein the metal shell comprises a contact portion configured to connect the metal shell to the connector, and
   wherein the metal shell comprises a plurality of cylindrical bodies coupled to each other and having different diameters.

2. The cable device of claim 1, wherein the metal shell comprises:
   a metal body having a cylindrical shape.

3. The cable device of claim 1, wherein the conductive case is connected to the ground electrode.

4. The cable device of claim 1, wherein the contact portion is formed of a metallic material.

5. The cable device of claim 2, wherein the connecting member comprises at least one cutout portion, and
   wherein the contact portion does not overlap the at least one cutout portion.

6. The cable device of claim 1, wherein the contact portion comprises at least one of a metal wire, a metal plate, a metal bar, and a braided wire.

7. The cable device of claim 1, wherein the metal shell further comprises an adjustment device configured to telescopically adjust the plurality of cylindrical bodies.

8. The cable device of claim 7, wherein the adjustment device comprises a handle configured to move the plurality of cylindrical bodies in a sliding manner to increase or decrease an overlap of the plurality of cylindrical bodies.

9. The cable device of claim 8, wherein the adjustment device further comprises a guide portion having a plurality of grooves configured to lock the handle at different positions.

10. The cable device of claim 1, wherein the metal shell comprises a metal band configured to wind around an outside of the cable when rotated.

11. The cable device of claim 10, wherein a length of the metal band is variable according to a number of rotations in which the metal band is wound around the cable.

12. The cable device of claim 11, further comprising a rotating bar configured to vary the number of rotations in which the metal band is wound around the cable.

13. The cable device of claim 1, wherein the connecting member has a cylindrical shape.

14. A cable device comprising:
    a cable comprising an optical fiber;
    a connector comprising:
      a printed circuit board comprising a ground electrode connected to the cable; and
      a conductive case accommodating the printed circuit board;
    a connecting member provided outside of the connector and formed of an insulating material, the connecting member being configured to connect the cable to the connector and being disposed between the conductive case and the cable; and
    a metal shell surrounding the cable inside of the connecting member and comprising a contact portion connecting the metal shell and the conductive case, the metal shell being configured to shield electromagnetic interference (EMI) of the cable and the connector,
    wherein the metal shell comprises a cylindrical body formed of a metallic material and an adjustment device configured to vary a length of the metal shell.

15. The cable device of claim 14, wherein the conductive case is connected to the ground electrode.

16. The cable device of claim 14, wherein the connecting member comprises at least one cutout portion,
    the at least one cutout portion comprises at least one slit, and
    the contact portion is separated from the at least one slit.

17. The cable device of claim 14, wherein the metal shell comprises a plurality of cylindrical bodies coupled to each other and having different diameters.

18. The cable device of claim 17, wherein the adjustment device comprises a handle configured to telescopically adjust the plurality of cylindrical bodies to increase or decrease an overlap of the plurality of cylindrical bodies.

* * * * *